(12) United States Patent
Rodriguez Cuartas et al.

(10) Patent No.: US 8,984,910 B2
(45) Date of Patent: Mar. 24, 2015

(54) LEAD-CONTAINING FLAT GLASS PRODUCED BY A METAL BATH FLOAT GLASS PROCESS

(75) Inventors: Ramon Rodriguez Cuartas, Aviles (ES); Christian Bouigeon, Zary (PL); Juan Luis Fernandez Suarez, Aviles (ES)

(73) Assignee: Saint-Gobain Glass France, Courbevoie (FR)

( * ) Notice: Subject to any disclaimer, the term of this patent is extended or adjusted under 35 U.S.C. 154(b) by 2398 days.

(21) Appl. No.: 10/589,081

(22) PCT Filed: Feb. 14, 2005

(86) PCT No.: PCT/FR2005/050094
§ 371 (c)(1),
(2), (4) Date: Jan. 10, 2007

(87) PCT Pub. No.: WO2005/080279
PCT Pub. Date: Sep. 1, 2005

(65) Prior Publication Data
US 2008/0149863 A1    Jun. 26, 2008

(30) Foreign Application Priority Data
Feb. 16, 2004 (FR) ................................ 04 01499

(51) Int. Cl.
*C03B 18/02* (2006.01)
*C03B 18/20* (2006.01)
*C03B 18/18* (2006.01)
(Continued)

(52) U.S. Cl.
CPC ................. *C03B 18/20* (2013.01); *C03B 18/18* (2013.01); *C03C 3/07* (2013.01); *C03C 4/087* (2013.01)

USPC ............................................. 65/99.2; 501/22

(58) Field of Classification Search
USPC ........ 65/66, 90, 99.1, 99.2, 99.3, 99.4, 136.2, 65/135.9, 134.1, 178; 501/22, 60, 74
See application file for complete search history.

(56) References Cited

U.S. PATENT DOCUMENTS 2,223,118 A    11/1940  Miller
3,332,763 A *  7/1967  Basler et al. ................... 65/32.5
(Continued)

FOREIGN PATENT DOCUMENTS

EP    0 525 555     2/1993
EP    0 5920237    4/1994
(Continued)

OTHER PUBLICATIONS

1.Structure Changes in the Molten Oxide System: Lead Oxide-Germanium Dioxide E. F. Riebling Inorganic Chemistry 1964 3 (7), 958-962.*

(Continued)

*Primary Examiner* — Richard Crispino
*Assistant Examiner* — Yana B Krinker
(74) *Attorney, Agent, or Firm* — Oblon, McClelland, Maier & Neustadt, L.L.P.

(57) ABSTRACT

The invention relates to a process for manufacturing flat glass rich in lead oxide, comprising the continuous floating, in a float plant with a neutral gaseous atmosphere, of a glass comprising at least 30% lead oxide by weight on a bath of molten metal having a higher density than that of the glass. The invention allows flat glass rich in lead, useful for protection against X-rays, to be produced.

17 Claims, 1 Drawing Sheet

(51) Int. Cl.
*C03C 3/07* (2006.01)
*C03C 4/08* (2006.01)

(56) References Cited

U.S. PATENT DOCUMENTS

| | | | | |
|---|---|---|---|---|
| 3,674,453 | A | * | 7/1972 | Loukes et al. ............... 65/30.13 |
| 3,801,412 | A | * | 4/1974 | Brichard ........................ 501/70 |
| 3,806,412 | A | * | 4/1974 | Brichard ........................ 435/265 |
| 3,881,905 | A | * | 5/1975 | Cramer et al. ................ 65/99.4 |
| 4,015,966 | A | | 4/1977 | Weaver |
| 4,027,074 | A | * | 5/1977 | Cross et al. .................. 428/450 |
| 4,876,480 | A | | 10/1989 | Palac et al. |
| 4,877,449 | A | | 10/1989 | Khinkis |
| 5,073,524 | A | * | 12/1991 | Speit .............................. 501/60 |
| 5,120,579 | A | * | 6/1992 | Gardner et al. ............ 427/376.2 |
| 5,215,944 | A | | 6/1993 | Jones |
| 5,221,646 | A | * | 6/1993 | Blackburn et al. .............. 501/55 |
| 6,119,485 | A | * | 9/2000 | Hibino et al. .................. 65/305 |
| 6,846,760 | B2 | * | 1/2005 | Siebers et al. .................. 501/32 |
| 7,428,827 | B2 | * | 9/2008 | Maugendre et al. ............ 65/121 |
| 2002/0162358 | A1 | * | 11/2002 | Jeanvoine et al. ........... 65/134.5 |
| 2004/0224833 | A1 | * | 11/2004 | Jeanvoine et al. .............. 501/70 |
| 2005/0028559 | A1 | * | 2/2005 | Hiromatsu et al. ............ 65/99.2 |
| 2006/0105899 | A1 | | 5/2006 | Jacques et al. |

FOREIGN PATENT DOCUMENTS

| | | |
|---|---|---|
| FR | 2 774 085 | 7/1999 |
| FR | 2 843 107 | 2/2004 |
| JP | 2-212331 | 8/1990 |
| JP | 9-208255 | 8/1997 |
| JP | 2000-247658 A | 9/2000 |
| JP | 2000-247658 A5 | 9/2000 |
| WO | WO03044859 * | 6/2010 ............. C03B 5/235 |

OTHER PUBLICATIONS

Shelby, James E., Lead Galliate Glasses. Journal of the American Ceramic Society, 71: C-254-C-256. doi: 10.1111/j.1151-2916.1988.tb05072.x.*

LX-57B Lead Glass for Radiation Shielding [online], Direct Scientific, retrived from: http://www.drct.com/dss/Lead_glass/lead_glass.htm on Mar. 7, 2011.*

* cited by examiner

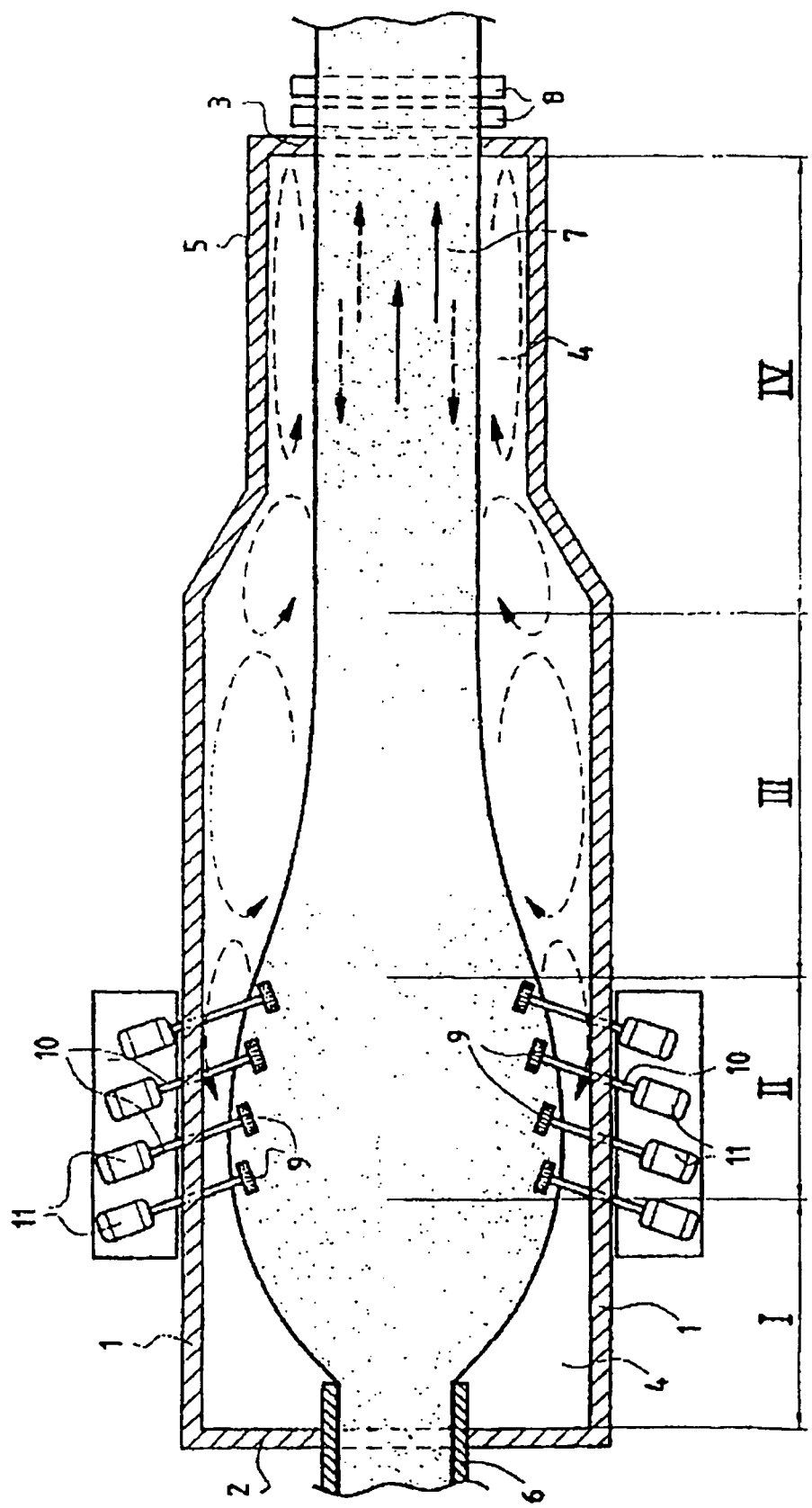

LEAD-CONTAINING FLAT GLASS PRODUCED BY A METAL BATH FLOAT GLASS PROCESS

The present application is a U.S. counterpart of WO 2005/080279 and claims priority to the French Application No. 04/01499 filed Feb. 16, 2004.

The invention relates to the production of a flat glass rich in lead oxide by floating on a bath of molten metal.

It is known to produce flat glass of the soda-lime-silica type by floating on a bath of molten metal, generally based on tin. The soda-lime-silica glass has a density much less than that of tin (the density of this glass is about 2.5, whereas the density of molten tin is about 7) and the floating of the glass takes place correctly without the top rolls pressing in too pronounced a manner into the ribbon of glass floating on the liquid metal. To avoid oxidation of the tin, the atmosphere of the float plant is usually maintained in a reducing medium, generally thanks to the presence of hydrogen in the gaseous atmosphere above the glass and metal. This gaseous atmosphere is generally composed of nitrogen containing 7 to 15% hydrogen by volume.

Glass rich in lead oxide, to which the present application applies, contains at least 30% lead oxide PbO by weight. It is used more particularly when protection against X-rays has to be provided, especially in the medical or nuclear field. Such glass is intended to be incorporated into partitions, windows and handling boxes, and is reputed not to be produced by the float method because of its high density, approaching that of tin. This is because there is a fear that the ribbon will be pressed into the molten float metal, in particular owing to the effect of the top rolls, and there is also the fear of exchange between the lead of the glass and the environment of the float plant, the tin, the refractory or the atmosphere. Such exchange could result in the lead oxide being reduced, to produce metallic lead, which could evaporate and then condense in droplets, falling on the glass and marking it (the formation of "top lead" on the surface of the glass).

U.S. Pat. No. 4,015,966 clearly teaches the difficulty of devising ways of floating compositions comprising lead, antimony or arsenic oxides to such a point that it recommends, for the float process, for X-ray-absorbent compositions to contain in particular none of these oxides. That document also recommends carrying out the float process in a reducing atmosphere. For all the reasons mentioned above, lead-rich glass is usually manufactured in a batch process by "in-pot" melting, followed by casting on a table, followed by polishing or smoothing in order to achieve a flat glass. However, this process is particularly tedious and expensive. Flat glass 6, 8 and 12 mm in thickness can thus be produced. However, it is not known how to produce thinner glass, such as that with a thickness of 3.5 mm, as the glass with such a small thickness is too fragile for the process described above.

EP 525 555 teaches that lead oxide in a glass is to be prescribed when the glass is to be produced by the float process. EP 592 237 teaches that lead glass cannot be produced by the float process.

U.S. Pat. No. 5,073,524 and U.S. Pat. No. 2,223,118 teach compositions rich in lead.

As other documents of the prior art, mention may be made of U.S. Pat. No. 5,221,646 and U.S. Pat. No. 4,876,480.

In addition to the abovementioned problems associated with the presence of lead in such glass, the Applicant has observed, from float tests under standard float conditions for soda-lime-silica glass, that a grayish film inevitably forms on the surface of the glass that is in contact with the atmosphere of the float plant. The Applicant has discovered that this film is a thin layer of metallic lead and has also discovered that this film could be avoided by removing the reducing nature of the gaseous atmosphere of the plant (absence of hydrogen). Thus, in the process according to the invention, it is preferred to use a neutral atmosphere, that is to say one that is neither oxidizing nor reducing, such as a nitrogen atmosphere. In practice, it is difficult to achieve an absolute zero oxygen content, but it is recommended to reduce the oxygen content of the atmosphere as low as possible in order to limit oxidation of the tin of the float bath. The gaseous atmosphere in the float plant preferably contains less than 5 ppmv (parts by million by volume) of oxygen. It may essentially be composed of nitrogen.

Apart from the particular composition of the glass and of the neutral atmosphere in the float plant, the latter is itself identical to the float plants usually employed for more conventional glass, such as that of the soda-lime-silica type.

The invention therefore relates to a process for the manufacture of a ribbon of glass rich in lead oxide produced by the float process, in which the ribbon, formed on a bath of molten metal, even one based on tin, progresses by floating on this bath, said ribbon being removed from the bath when it has solidified sufficiently.

Glass rich in lead oxide to which the present application relates contains at least 30% and even at least 45%, or indeed at least 60% by weight of lead oxide PbO. Such glass generally contains up to 75% and more particularly up to 70% by weight of lead oxide PbO. Such glass may also include barium oxide BaO, barium being a heavy element that can also stop X-rays. The glass may for example comprise 2 to 20% BaO by weight. In general, the glass comprises silica in an amount from 25 to 35% by weight. The glass also generally comprises $K_2O$ and/or $Na_2O$, the sum of the mass of $K_2O$ and $Na_2O$ generally ranging from 0.2 to 1% by weight.

Such glass generally has a density ranging from 4 to 6 and more particularly a density ranging from 4.3 to 5.5.

In the manufacture of a ribbon of float glass for the purpose of producing sheets of flat glass, molten glass is poured onto a bath of molten metal, generally tin or a predominantly tin-based alloy, where it forms said continuous ribbon, which is progressively cooled and extracted by means of extractor rolls that convey it into an annealing furnace called a lehr. The region covering the glass ribbon while it is running along the bath of molten metal comprises heating systems and cooling systems that are provided for conditioning the temperature and, more precisely, the viscosity of the glass in order to allow it to be drawn to the desired thickness and then solidified.

The thickness of the glass ribbon is determined by the tensile force exerted on the glass ribbon, on the one hand, by the extractor rolls and possibly, on the other hand, by the action of knurled top rolls that act on the upper edges of the glass ribbon. This is because, for a given output, that is to say for a certain quantity of glass leaving the furnace per given unit of time, the thickness of the ribbon of float glass depends on the speed of said glass ribbon in the layer.

While the glass ribbon is running along the bath of molten metal, said ribbon will therefore undergo a drawing in order to reduce its thickness. This drawing is obtained, for outputs of between 2 and 200 tonnes per day and more particularly 5 to 100 tonnes per day, with ribbon speeds of between 0.1 and 20 meters per minute and more particularly 0.2 and 10 meters per minute. It is also known that such speeds of the glass ribbon running along the bath of molten metal cause, beneath said ribbon, a tin current directed toward the colder exit end of the bath, which may be termed the downstream current. The metal entrained by the ribbon following this downstream current butts against the exit wall of the bath and then, by reflection therefrom, it forms a return current directed toward the upstream end of the bath, which may be termed the upstream current. This upstream current is particularly substantial between the edges of the glass ribbon and the side walls of the bath. To limit the effect of this upstream current, the bath may be equipped with tweels as proposed by U.S. Pat. No. 4,217,125. The bath may also be equipped with recirculation circuits for recirculating the tin from the downstream end toward the upstream end of the bath via pipes external to the bath (see GB 1 166 648 and U.S. Pat. No. 3,658,504) or even inside the bath (see abstract JP 59121125 and U.S. Pat. No. 3,790,361).

Thus, the invention relates to a process for manufacturing flat glass rich in lead oxide, comprising the continuous floating, in a float plant with a neutral gaseous atmosphere, of a glass comprising at least 30% lead oxide by weight on a bath of molten metal having a higher density than that of the glass.

For the case in which tin oxide would nevertheless slowly form because of the very slight contamination of the atmosphere with oxygen, an elimination means for eliminating this oxide which floats on the surface of the metal bath may be provided. This elimination means may be a device for eliminating the solid floating matter, such as skim pockets downstream of the bath or the dedrossing means described in U.S. Pat. No. 4,046,549. This means may also involve recirculation of the tin via an external pipe passing through a purification unit intended to remove or reduce the tin oxide formed, for example by hydrogen sparging, as described in FR 1 323 711, followed by elimination of the hydrogen before reintroduction.

Moreover, so as to remove other metals, such as iron, sparging with steam may also be effected.

If the tin is made to circulate outside the plant in order to treat it, it may also be treated in order to remove its iron. This iron elimination is desirable as too high an iron concentration in the tin results in the formation of solid particles of an iron/tin alloy that will become encrusted in that face of the glass which is in contact with the bath, producing defects. This iron elimination process is carried out by precipitation, by cooling. By cooling between 250 and 450° C., especially between 270 and 350° C., $FeSn_2$ is precipitated. The iron may also be chemically separated from the tin in a suitable reactor.

Moreover, since the tin of the bath of molten metal risks becoming laden with lead, provision may be made for draining off the tin via a pipe in order to bring it to a treatment station for removing the lead. This elimination may be carried out by chemical reprocessing.

Thus, the invention also relates to a float process comprising a treatment station (or unit) especially for purifying the tin of the float bath (the bath of molten metal) associated with said bath.

The tin, optionally stripped of the lead and/or the iron, is then reinjected into the bath. If necessary, the treated tin is reheated before it is reinjected if its temperature has dropped during the treatment. The reheating brings the temperature of the tin to be reinjected close to that of the bath at the reinjection point.

The float plant is supplied at the upstream end with molten glass. This molten glass is prepared by melting batch materials in at least one melting furnace located upstream of the float plant. These batch materials may comprise: cullet, $Pb_2O_3$, silica, sand, Zr-rich sand (the precursor for $ZrO_2$), barium carbonate (the precursor for BaO), KOH (the precursor for $K_2O$), etc.

By way of example of a melt furnace, it is possible to use two tanks in series, the second tank being at a lower temperature than the first and being supplied with lead oxide. In particular, the device may be used with the two following tanks in series:
- the first being equipped with submerged burners heating the furnace to between 1100 and 1300° C., which is supplied for example in particular with cullet, Ba carbonate and, optionally, other batch materials, all these representing, for example, between 30 and 70% of the total output, a flue allowing the gases formed to be discharged;
- the second being equipped with $SnO_2$ electrodes keeping the furnace between 800° C. and 1200° C., and not including fume extraction, the tank being supplied with the composition coming from the first tank and with lead oxide, and optionally with other batch materials, the composition thus obtained feeding the float plant.

Introducing lead oxide into the second, cooler tank with no flue prevents the lead oxide from flying around. This is because lead oxide is noxious and it is necessary to prevent it from evaporating and penetrating into the external environment. The second tank may be equipped with a stirrer for thermal and compositional homogenization. It is also possible for it not to be equipped with a stirrer, but in this case provision is nevertheless made for homogenizing (in terms of temperature and composition) the glass, in the flow channel that takes the glass to the float plant, said channel then being provided with at least one stirrer, or in a mixing cell provided with at least one stirrer placed between the second tank and the float plant.

Thus, according to a variant, before the float plant, the glass may be melted in a furnace that includes at least one submerged burner. In particular, the furnace may comprise at least two tanks in series, the second tank being fed with lead oxide. The first tank may especially be equipped with at least one submerged burner and may be fed with the batch materials other than lead oxide. In particular, the second tank is advantageously at a lower temperature than the first tank.

The glass is generally at a temperature of between 700 and 900° C. upstream of the float plant and between 400 and 600° C. downstream of the float plant. Overall, it may be stated that the float glass is between 400 and 900° C. and more particularly between 500 and 800° C. The temperature of the bath of molten metal is lower than the temperature of a bath of molten metal of a float plant for a soda-lime-silica glass containing no lead. It may be considered that the temperature of the glass is substantially the same as that of the bath at the same point.

The glass manufactured by the process according to the invention is in general enriched with tin on that side that has been in contact with the bath of molten metal, for example with a concentration possibly up to 2% by weight, for example 0.01 to 2% by weight, at least over the first micron of the skin, and even over the first few microns of the skin. The tin content forms a concentration gradient that decreases from the surface of the glazing toward the core.

The process according to the invention allows the production of flat glass with a thickness ranging from 1 to 25 mm in thickness, especially between 3 and 14 mm in thickness. The thickness may therefore be less than 5 mm and even less than 4 mm.

On the molten metal, the ribbon may have a width ranging from 0.90 to 6 meters and more generally from 1 to 4 meters. On leaving the forming plant, the ribbon passes into a lehr for progressively cooling it, after which the ribbon is cut longitudinally (cutting of strips from two edges) and transversely into panels comprising two principal faces and an edge. Each principal face of these panels may for example have an area ranging from 0.15 $m^2$ to 20 $m^2$.

The figure shows an elongated tank for the manufacture of glass by the float process. The tank has side walls 1 and end walls 2 and 3, at the entry and exit of the tank, respectively. The tank, containing a bath of molten tin 4, has a downstream part 5 of smaller width. The molten glass is poured onto the bath at its entry end, from a delivery channel 6 placed above the entry wall of the tank. Temperature regulators (such as SiC resistance heating elements), which are not shown in the figures, are incorporated into the roof that covers the bath. These regulators thermally condition the glass, keeping it in the deformable state until the end of the drawing zone. The bath comprises, in the manufacture of the glass, several zones represented in the figure, which may be distinguished in the following manner:

- a zone I, in which the glass spreads out after being poured, upstream, onto the molten metal;
- a zone II, in which the glass ribbon being formed undergoes longitudinal forces that are directed toward the outside, under the action of the extractor rolls 8 and the top rolls 9. The drawing of the glass starts in this zone, the glass becoming thinner;
- a zone III in which the glass ribbon assumes its final shape under the action of the extractor rolls 8. The zones II and III together form the drawing zone; and
- a consolidation zone IV in which the solidified glass ribbon is progressively cooled.

After having been poured onto the bath of molten metal, the glass freely spreads out as far as possible in zone I. A ribbon 7 thus forms which moves toward the downstream end under the effect of the traction by the extractor rolls 8 external to the tank. The desired thickness is then obtained by the combined action of the traction by the extractor rolls 8 and of the knurled top rolls 9, which are generally made of steel and slightly oblique relative to the perpendicular to the direction of advance of the ribbon. These top rolls are connected via a shaft 10 to motors 11, which generally drive them at speeds which differ depending on their position and increase on going toward the downstream end. These rolls apply, to the edges of the glass ribbon being formed, forces that prevent the glass ribbon from necking. The glass ribbon then undergoes a drawing operation in the zone with these top rolls. The glass ribbon is then brought to the desired thickness by drawing due to the extractor rolls.

Next, the ribbon passes into the lehr, in order for the glass to be cooled very steadily and uniformly. The ribbon is then cut into panels, conventionally by transverse and longitudinal cutting.

The invention also relates to the use of the flat glass according to the invention for protection against X-rays.

The invention claimed is:

1. A process for manufacturing flat glass rich in lead oxide, comprising:
    continuously floating a ribbon of glass containing at least 30% lead oxide by weight on a bath of molten metal comprising tin which bath of molten metal has a density higher than that of the glass;
    wherein said floating occurs in a float plant with a neutral gaseous atmosphere above the ribbon of glass and bath of molten metal.

2. The process as claimed in claim 1, wherein the neutral gaseous atmosphere comprises less than 5 ppmv oxygen.

3. The process as claimed in claim 1, wherein the neutral gaseous atmosphere is a nitrogen atmosphere.

4. The process as claimed in claim 1, wherein the temperature of the bath of molten metal is lower than the temperature of a bath of molten metal in a float plant for a soda-lime-silica glass containing no lead.

5. The process as claimed in claim 1, wherein the temperature of the floating glass is between 500° C. and 800° C.

6. The process as claimed in claim 1, wherein a molten metal treatment station is included with said bath.

7. The process as claimed in claim 1, wherein the glass comprises at least 45% lead oxide by weight.

8. The process as claimed in claim 1, wherein the glass comprises at least 60% lead oxide by weight.

9. The process as claimed in claim 1, wherein the glass has a density ranging from 4 to 6.

10. The process as claimed in claim 1, wherein the glass has a density ranging from 4.3 to 5.5.

11. The process as claimed in claim 1, wherein, before the float plant, the glass is melted in a furnace that includes at least one submerged burner.

12. The process as claimed in claim 11, wherein the furnace comprises at least a first and a second tank in series, the second tank being fed with lead oxide.

13. The process as claimed in claim 12, wherein the first tank is equipped with at least one submerged burner and is fed with the batch materials other than lead oxide.

14. The process as claimed in claim 12, wherein the second tank is at a lower temperature than the first tank.

15. The process of claim 1, wherein said neutral gaseous atmosphere does not contain hydrogen.

16. The process of claim 1, wherein the neutral gaseous atmosphere contains less than 5 ppmv oxygen, the temperature of the floating glass ranges between 500° C. and 800° C., and the glass has a density ranging from 4 to 6.

17. A process for manufacturing flat glass rich in lead oxide, comprising:
    continuously floating a ribbon of glass containing at least 30% lead oxide by weight on a bath of molten metal comprising tin which bath of molten metal has a density higher than that of the glass;
    wherein said floating occurs in a float plant that contains an atmosphere above the ribbon of glass and bath of molten metal that consists essentially of neutral gases, but which may contain up to 5 ppm oxygen.

* * * * *